United States Patent [19]

Bendzick

[11] 3,853,451
[45] Dec. 10, 1974

[54] STRIPPER DEVICE FOR MOLDED ARTICLES

[75] Inventor: Marvin F. Bendzick, Pittsburgh, Pa.

[73] Assignee: Cities Service Company, New York, N.Y.

[22] Filed: Aug. 31, 1973

[21] Appl. No.: 393,353

[52] U.S. Cl................. 425/438, 425/443, 249/68, 164/344
[51] Int. Cl............................................. B29c 7/00
[58] Field of Search .......... 425/139, 165, 344, 351, 425/398, 436, 438, 441, 443, 444; 264/334; 249/68; 164/131, 344

[56] References Cited
UNITED STATES PATENTS

| 3,534,443 | 10/1970 | Tucker | 425/443 |
| 3,712,787 | 1/1973 | Barnes | 425/444 X |

Primary Examiner—Roy Lake
Assistant Examiner—Neil Abrams
Attorney, Agent, or Firm—R. S. Strickler

[57] ABSTRACT

A device for stripping a molded piece part from a pair of separable die members.

6 Claims, 5 Drawing Figures

PATENTED DEC 10 1974  3,853,451

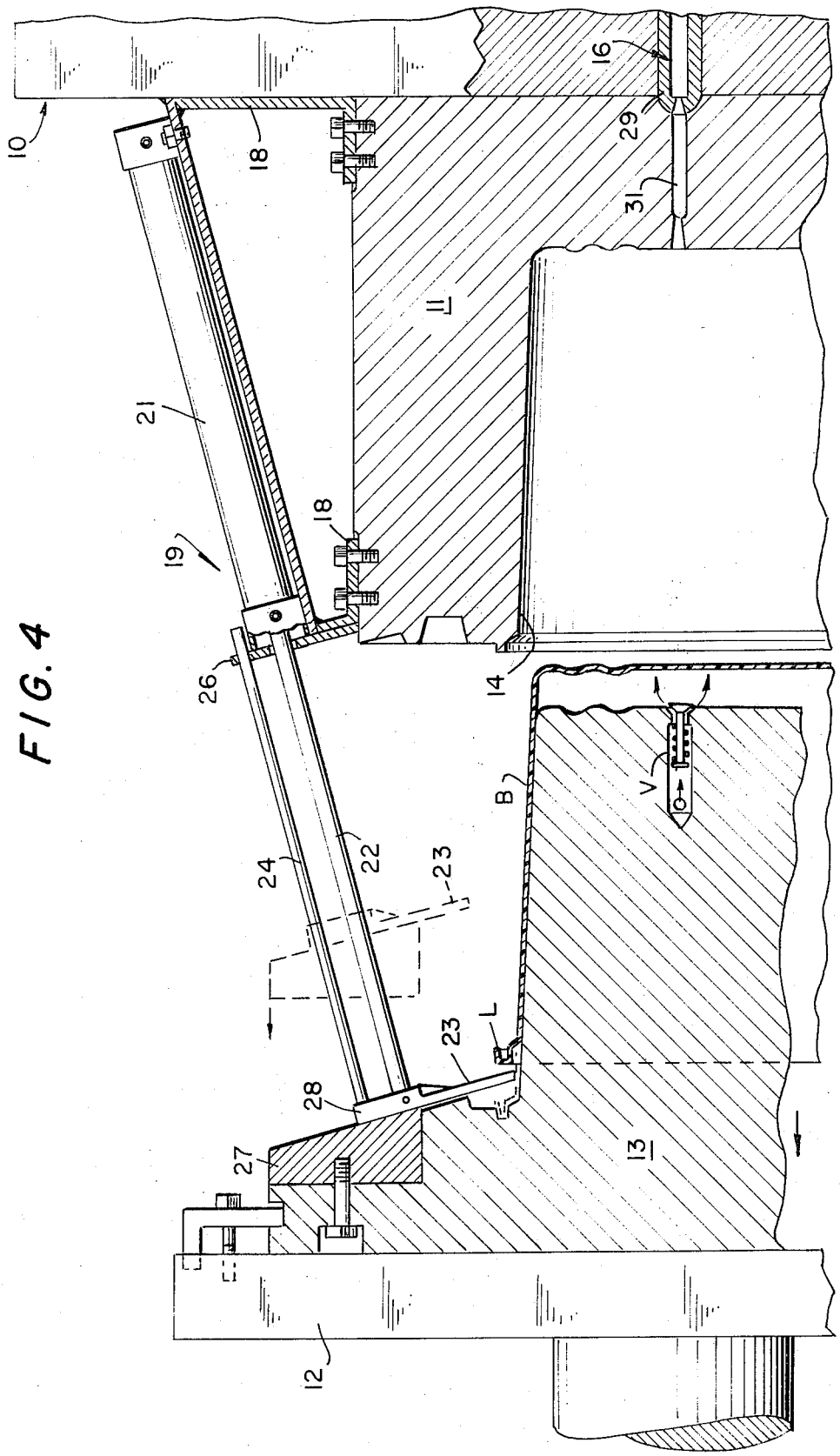

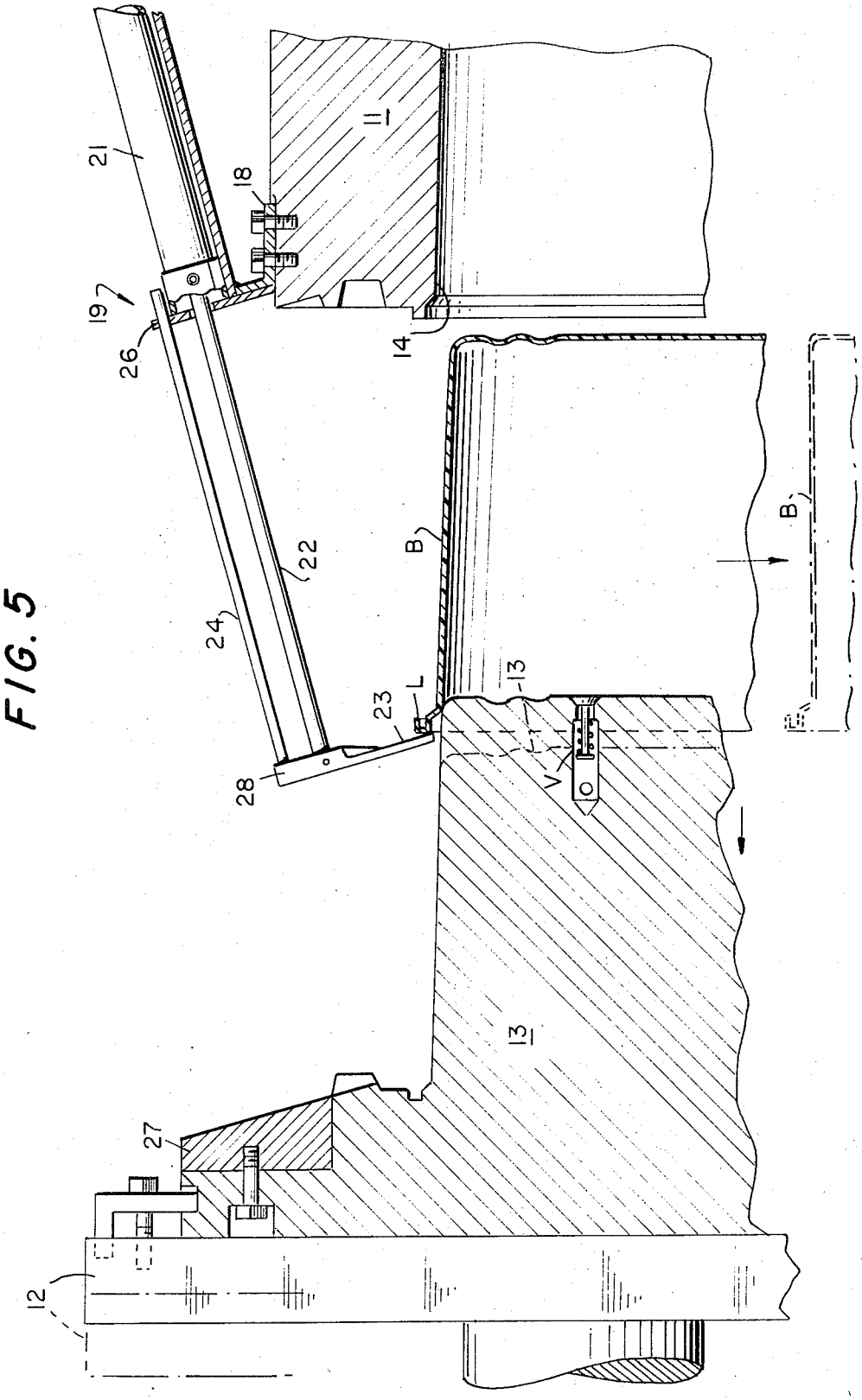

STRIPPER DEVICE FOR MOLDED ARTICLES

BACKGROUND OF THE INVENTION

The present invention relates to molding apparatus and in particular relates to a mechanism for automatically and sequentially stripping or removing molded piece parts from a mold or die set comprising a pair of cooperating die members.

In the art of molding deep draft receptacles which have a depth dimension greater than one third the transverse dimension, problems are encountered in extracting, withdrawing or stripping the molded article from the mold or die set after the molding operation.

Frequently, it is necessary to enter the operative area of the die set and manually strip the molded article from the male or female die member after completion of the molding operation at great risk of bodily harm.

Furthermore, the necessity to perform manual steps during the molding cycle increases the overall time required to produce an article and precludes the generation of a fully automatic operation.

In prior art stripping devices, it was frequently necessary to utilize an articulated element which moved coordinately in two directions and sometimes three directions.

For example, such a prior device would move sequentially in a first direction along a first path towards the article to be stripped and thereafter move along a second path into contact with the article to accomplish the stripping action and in some cases, along a third path in returning to its starting position.

A representative example of a prior art stripping device is disclosed and described in U.S. Pat. No. 1,872,327 issued Aug. 16, 1932 to E. L. Patten.

In contrast the stripper device of the present invention embraces a simple unit which moves along a single path in reciprocatory fashion.

Consequently, it is a feature of the present invention to provide a stripper device for removing molded articles from cooperating die members where the device moves to-and-fro along a single linear path.

A further feature of the present invention is the provision of a mold stripping device which operates automatically and eliminates the necessity for a machine operator to enter the danger or "live" area of the die set.

A further feature of the invention is the provision of a stripping device which in the course of its operation is entirely free from and never touches the surfaces of die members which define the mold cavity and thus the configuration of the molded article.

A further feature of the invention is the provision of a stripper device so constructed and so arranged that there is never any danger of interference between the stripper device and the die members tending to deface or mutilate expensive tooling.

In the art of molding open ended containers such as buckets, baskets, tubs and the like articles, it is customary to use a separable mold or die set comprising a male die member and a cooperating female die member which, in an operative position, define a mold cavity having a configuration which is representative of the article to be molded.

Moldable material such as plastic compounds, paper pulp, molten resins or molten metallic materials are introduced into the die cavity under pressure to form or mold an article in a configuration corresponding to the shape of the cooperating die members which define the mold cavity.

After the molding operation, the die set is separated and the molded article adheres to one or the other of the die members and must be stripped therefrom before a new molding cycle can be started.

Prior art mechanical strippers are two or three step units and frequently require manual help from an operator.

As stated previously, the present invention relates to a novel stripper device of simple design useful to remove the molded article from the die member to which it tends to adhere in a single step, automatically, and without the participation of an operator.

SUMMARY OF THE INVENTION

An apparatus embracing certain features of the present invention may comprise a separable die set comprising a first die member and a second cooperating die member defining in an operative position, a mold cavity having a tubular, hollow body and a contiguous lip, means for introducing moldable material into the cavity to form an article having a configuration matching said cavity including said lip, means for separating the die members whereby the molded article is carried by one die member during the occurence of separation, a stripper hook supported by said second die member operative to move to-and-fro along a linear path from a first position corresponding to a closed die position to a second position corresponding to an open die, said stripper hook in said second position being operative to engage said lip whereby said molded article is stripped from said one die member as die separation continues.

BRIEF DESCRIPTION OF THE DRAWINGS

Other features and advantages of the present invention will become more apparent from an examination of the following specification which read in conjunction with the appended drawings, in which;

FIG. 4 shows the die set partially open and illustrating the disposition of the molded article relative to the male die member with the stripper hook extended and in the operative position.

FIG. 5 shows the die members fully separated and the molded article stripped free of the die set in position to drop by gravity to the dotted line position shown.

DETAILED DESCRIPTION OF THE INVENTION

Figure 1:
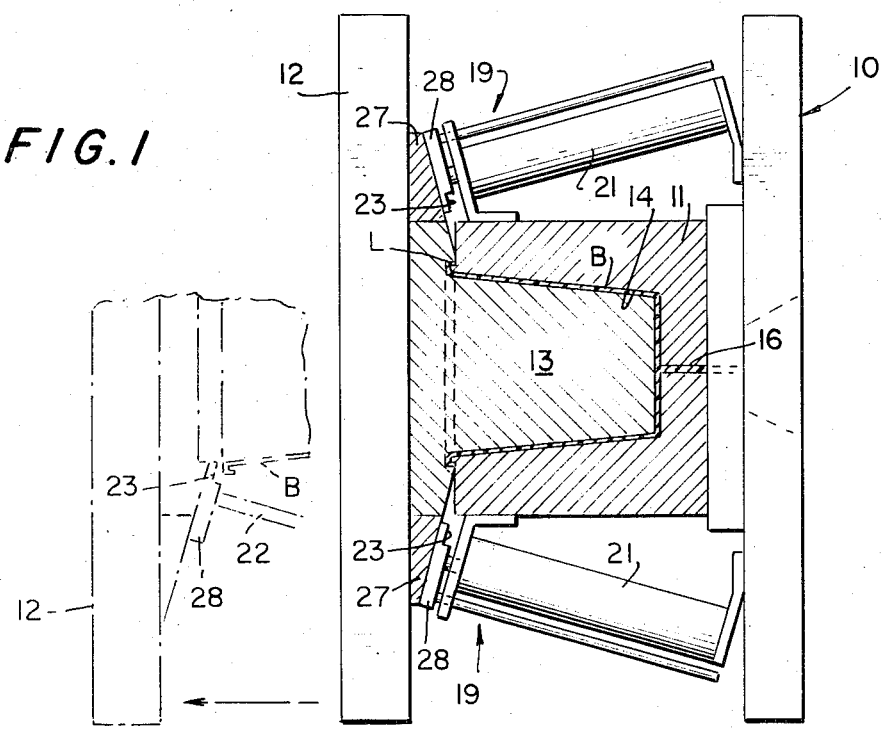
FIG. 1 is a plan view of the die set in the closed position with stripper devices disposed on opposite sides of a die set.
Figure 2:
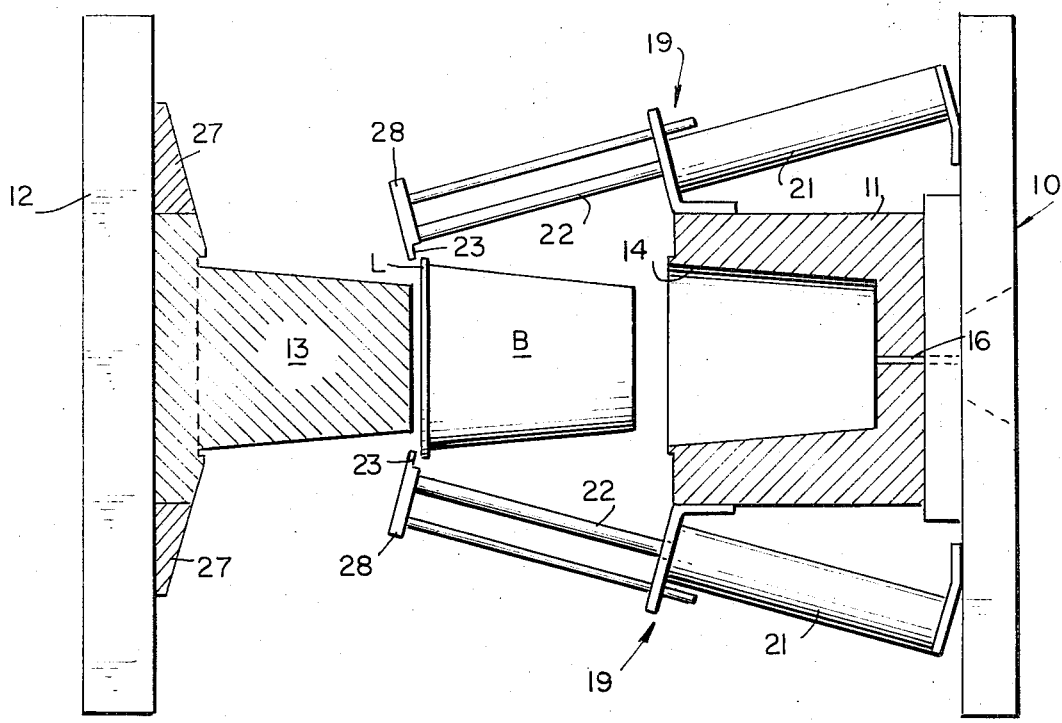
FIG. 2 is a view similar to FIG. 1 showing the die set in a fully open position with the molded article stripped from the male die.

Referring now in detail to the drawings, the reference numeral 10 designates a fixed platen carrying a female die 11 which cooperates with moveable platen 12 supporting male die 13 which, in the operative position, define mold cavity 14.

The mold cavity 14 outlines the configuration of a molded article such as bucket B formed of plastic material originating in a heated chamber (not-shown) and introduced into cavity 14 through nozzle 29 and passageway 31 in well known fashion to fill the mold cavity and generate bucket B having lip L.

Fixed to platen 10 and die 11 by means of bracket 18 is a stripper device indicated generally by the reference numeral 19. The stripper device is disposed at an angle of about 15° relative to the center line of the die set as is most apparent in FIG. 3.

The stripper device includes a cylinder 21 and a cooperating piston or ram 22 formed with a head or follower 28 terminating in a stripper hook 23. Guide rod 24 and cooperating bushing 26 are provided in order to maintain the hook 23 in the proper phase relationship relative to cylinder 21 and the lip L.

Male die 13 is provided with a way or guide 27 which cooperates with follower 28. Follower 28 may include a roller in some forms of the invention.

Figure 3:
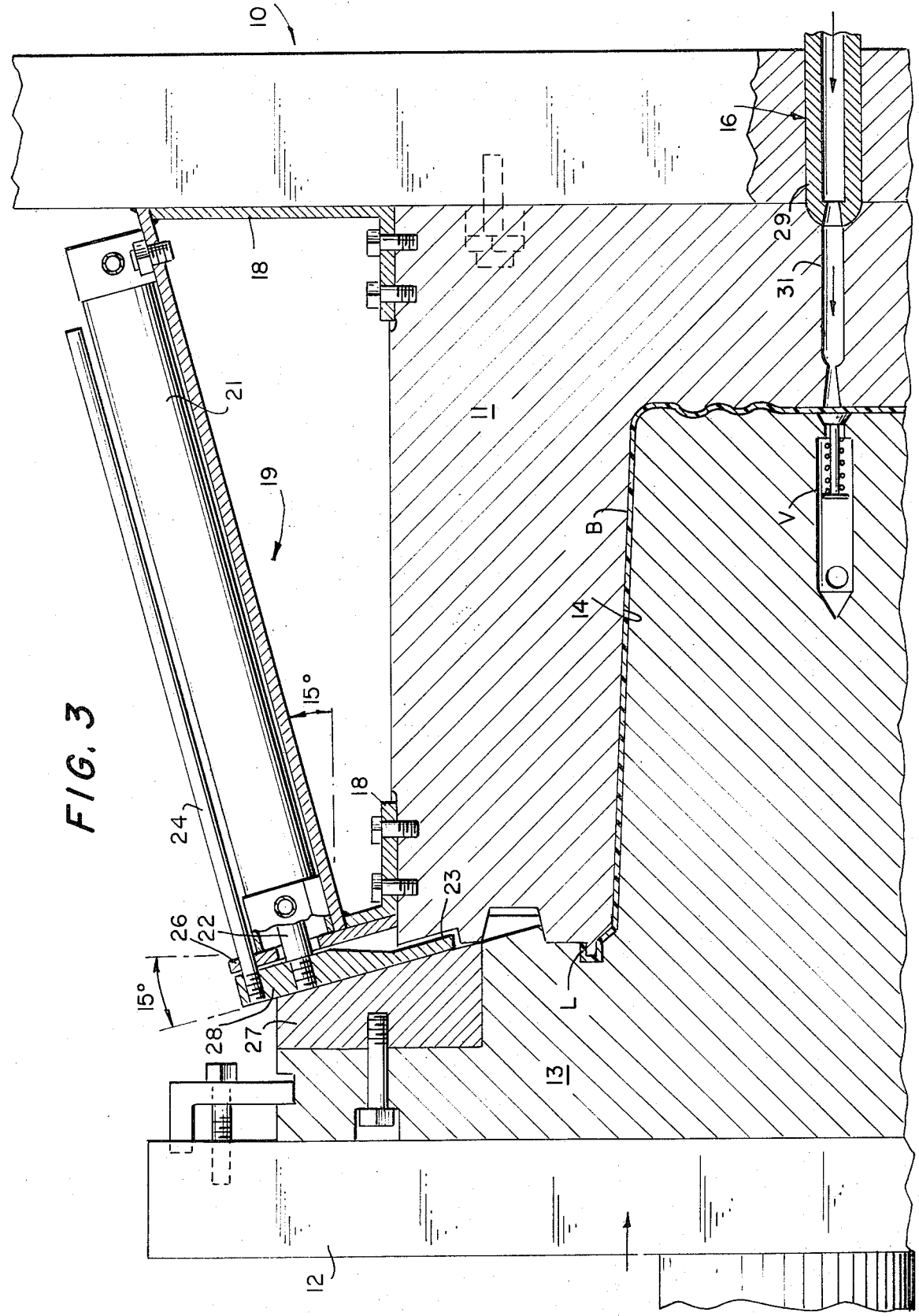
FIG. 3 is an enlarged, more detailed, view of a portion of the illustration of FIG. 1.

As is most apparent in FIG. 3 when the die set is in the closed or molding position follower 28 normally bears upon way 17 and ram 22 is in fully the retracted position.

In timed sequence after the molding operation and during the course of die separation, ram 22 carrying head 28 moves forward and follows way 27 and maintains sliding or rolling contact as die 13 moves to the left as viewed in FIG. 4.

Since the cylinder 21 is mounted at an angle of about 15° relative to the center line of the die set head 28 and contiguous hook 23 slides along guide 27 as the ram 22 moves from the retracted position of FIG. 3 to its fully extended position of FIG. 4.

Note in FIG. 4 that the stripper hook 23 does not come in contact with male die 13.

In operation the stripper device of the present invention sequences in the following fashion:

With the die set in the position shown in FIG. 3 suitable plastic compound is injected through nozzle 29 and conduit 31 into the die cavity 14 to mold a bucket B including lip L.

At this time the stripper hook 23 and its contiguous head 28 are in sliding contact with guide 27 as is most apparent in FIG. 3.

After the molding operation is completed and in timed sequence, male die member 13 begins withdrawing from female die member 11 and ram head 28 follows the guide 27 carried by die 13.

Head 28 slides along guide 27 and moves radially inward toward the male die as the male die progresses to the left as viewed in FIG. 4.

After the die 13 has moved to the left several inches carrying the molded bucket B (which shrinks and clings to the male die) a short blast of air under pressure is directed, in timed sequence, through valve assembly V causing bucket B to break away from male die 13 and move to the right to the position shown in FIG. 4.

This occurence provides clearance for stripper hook 23 to move behind bucket lip L as male die 13 continues to the left carrying partially dislodged bucket B.

Continued withdrawal of male die 13 brings about interference between stripper hook 23 and lip L causing bucket B to be held motionless while die 13 completes its stroke.

Ultimately the die member 13 is free of the bucket B as shown in FIG. 5 and the bucket is free to fall by gravity from the solid line position of FIG. 5 to the dotted line position thereof. Thereafter, in timed sequence, the male die member 13 returns to its operative position relative to stationary die 11. Correspondingly piston 22 returns to its original or normal position as shown in FIG. 3 and the molding operation is repeated in sequential fashion, automatically.

If ram 22 fails to retract automatically while die member 13 returns to its molding or operative position (FIG. 3), way 27 will drive the ram home without any damage to the die set.

Naturally, the ram can be deactivated if it is desired to return to manual operation for any reason.

While the disclosed embodiment of the invention shows two stripper hooks disposed approximately 180° apart, about the periphery of a cylindrical bucket B, obviously the stripper hook is effective as a single unit and the choice of one, two or three stripper devices is entirely dependent upon the design configuration of the article molded.

It is anticipated that a wide variety of embodiments and modifications and design changes can be developed without departing from the spirit and scope of the invention.

What is claimed is:

1. A device for stripping a piece-part from a die set comprising a first fixed die member, a second cooperating die member moveable relative to the first member along a predetermined path, said die set in the operative position defining a mold cavity including a lip configuration, means for introducing moldable material into the mold cavity to form an article matching said cavity including said lip, a piston and cylinder assembly mounted upon said fixed die and disposed externally of the die set, said assembly having a center line disposed at an angle relative to said predetermined path and means for moving the second die member and the piston in unison whereby the piston approaches the mold cavity in the region of said lip by virtue of the angular disposition of the assembly.

2. The device of claim 1 in which the second die member and the piston are formed with elements which cooperate to engage and maintain contact with one another while the die member and the piston move in unison.

3. The device of claim 1 in which the piston is formed with a follower terminating in an article engaging hook and the second die member is formed with a way cooperating with said follower.

4. The device of claim 1 in which the piston and cylinder assembly is provided with guide means for maintaining the piston in a predetermined phase relationship with respect to the cylinder.

5. The device of claim 1 in which the piston and cylinder assembly is disposed at an acute angle relative to said linear path.

6. A stripper device of automatically removing articles from one die member of a pair of die members which are relatively moveable along a linear path, a cylinder assembly having ram formed with a follower and a stripping hook carried by a die member, said ram being operable to reciprocate with a predetermined stroke, a second die member formed with a way cooperating with the follower, means for separating the die members and means for maintaining said follower in contact with said way whereby the stripper hook approaches the linear path during die member separation.

* * * * *